United States Patent
Chen et al.

(10) Patent No.: US 9,887,740 B2
(45) Date of Patent: Feb. 6, 2018

(54) CIRCUIT WITH BOTH FUNCTIONS OF WIRELESS POWER TRANSMITTER AND WIRELESS POWER RECEIVER AND DEVICE THEREOF

(71) Applicant: Generalplus Technology Inc., Hsinchu (TW)

(72) Inventors: Chia-Sheng Chen, Zhubei (TW); Down Xu Chuang, Miaoli County (TW); Shih-Chiang Wan, Zhubei (TW)

(73) Assignee: Generalplus Technology Inc., Hsinchu (TW)

( * ) Notice: Subject to any disclaimer, the term of this patent is extended or adjusted under 35 U.S.C. 154(b) by 506 days.

(21) Appl. No.: 14/659,070

(22) Filed: Mar. 16, 2015

(65) Prior Publication Data

US 2015/0280792 A1 Oct. 1, 2015

Related U.S. Application Data

(60) Provisional application No. 61/971,864, filed on Mar. 28, 2014.

(51) Int. Cl.
| | |
|---|---|
| *H04B 5/02* | (2006.01) |
| *H04B 5/00* | (2006.01) |
| *H02J 5/00* | (2016.01) |
| *H02J 7/02* | (2016.01) |
| *H02J 50/12* | (2016.01) |
| *H02J 50/80* | (2016.01) |

(52) U.S. Cl.
CPC ............ *H04B 5/0037* (2013.01); *H02J 5/005* (2013.01); *H02J 7/025* (2013.01); *H02J 50/12* (2016.02); *H02J 50/80* (2016.02)

(58) Field of Classification Search
CPC .. H02J 7/025; H02J 7/0052; H02J 2007/0059; H02J 5/005; H02J 50/12; H02J 50/80
USPC ......................................................... 307/104
See application file for complete search history.

(56) References Cited

U.S. PATENT DOCUMENTS

| | | | | |
|---|---|---|---|---|
| 9,748,774 | B2 * | 8/2017 | Van Den Brink | ...... H02J 5/005 |
| 2011/0254377 | A1 * | 10/2011 | Wildmer | ............... B60L 11/182 |
| | | | | 307/104 |
| 2013/0257360 | A1 * | 10/2013 | Singh | ...................... H01F 38/14 |
| | | | | 320/108 |
| 2014/0132077 | A1 * | 5/2014 | Nalbant | .................. H02M 1/38 |
| | | | | 307/104 |

(Continued)

*Primary Examiner* — Daniel Kessie
(74) *Attorney, Agent, or Firm* — Muncy, Geissler, Olds & Lowe, P.C.

(57) ABSTRACT

A device with both functions of wireless power transmitter and wireless power receiver and a circuit thereof are provided in the present invention. The device with both functions of wireless power transmitter and wireless power receiver and the circuit thereof use the same winding for performing the energy output and the energy receiving function. In addition, in order to use the same winding for performing the energy output and the energy receiving function, the present invention adopts full bridge topology. However, two lower switches are controlled by the resonant circuit when the device is in the energy receiving mode. The upper switches are not only for receiving the power voltage, but also for rectifying the energy received from the winding to output to the device with both functions of wireless power transmitter and wireless power receiver.

23 Claims, 9 Drawing Sheets

(56) References Cited

U.S. PATENT DOCUMENTS

2014/0206301 A1* 7/2014 Geddada ............... H03H 7/40
                                                    455/83
2014/0266481 A1* 9/2014 Shanan ............... H03B 5/1265
                                                 331/117 FE
2016/0218559 A1* 7/2016 Mehas ................. H02J 5/005

* cited by examiner

US 9,887,740 B2

CIRCUIT WITH BOTH FUNCTIONS OF WIRELESS POWER TRANSMITTER AND WIRELESS POWER RECEIVER AND DEVICE THEREOF

This application claims priority to U.S. Provisional Patent Application Ser. No. 61/971,864 filed on Mar. 28, 2014 which is incorporated herein by reference in its entirety.

BACKGROUND OF THE INVENTION

Field of the Invention

The present invention relates to the wireless charging technology, and more particularly to a circuit with both functions of wireless power transmitter and wireless power receiver and a device thereof.

Related Art

Wireless charging technology is a technology for charging device by electromagnetic field without any wire. Wireless charging technology is evolved from the wireless power transmission technology to use the magnetic resonant to transmit the electrical charge from charger to device to resonate coil and capacitor between the charge and device to achieve a high efficient power transmission. The wireless charger is safer, no exposed connections, no leakage current. Thus, many problems in wired charger are prevented. Due to the development of the wireless charging technology, Wireless Power Consortium is established because of the situation. One of accomplishments of Wireless Power Consortium is to promote Qi standard. With the standardization, wireless charging technology is more widely adopted.

FIG. 1 shows a circuit diagram of a wireless power transmitter disclosed by the Wireless Power Consortium. Referring to FIG. 1, the label L1 represents the primary winding. The switches 101, 102, 103 and 104 form a power conversion unit to control the LC resonant circuit 105 and its output power. FIG. 2 illustrates a circuit diagram of a wireless power receiver disclosed by the Wireless Power Consortium. Referring to FIG. 2, the label L2 represents the secondary winding. The switches 201 and 202 and the capacitors C201 and C202 forms a communication module. The switches 203 and 204 and the diodes D201 and D202 forms the rectifier circuit. Since the operation of the circuit is described by Qi of Wireless Power Consortium, the detail description is omitted.

Because of rapid development of wireless charging technology, some people try to put the wireless power transmitter and the wireless power receiver into the same device, such as a mobile power bank with both functions of wireless power transmitter and wireless power receiver. In other words, the mobile power bank must have the wireless power transmitter circuit and the wireless power receiver circuit. However, in Qi, the wireless power transmitter needs one coil, and the wireless power receiver needs another coil. If one device is designed to serve as the wireless power transmitter and the wireless power receiver, it requires two coils.

SUMMARY OF THE INVENTION

An object of the present invention is to provide a circuit with both functions of wireless power transmitter and wireless power receiver and a device thereof, so that the device uses only one coil to have the wireless power input function and the wireless power output function.

In view of this, the present invention provides a circuit with both functions of wireless power transmitter and wireless power receiver. The circuit with both functions of wireless power transmitter and wireless power receiver comprises a transceiver coil, a resonant capacitor, a first switch, a second switch, a third switch, a fourth switch, a communication circuit and a control circuit. The transceiver coil comprises a first terminal and a second terminal. The resonant capacitor comprises a first terminal and a second terminal, wherein the first terminal of the resonant capacitor is coupled to the second terminal of the transceiver coil. The first switch comprises a first terminal, a second terminal and a control terminal, wherein the first terminal of the first switch is coupled to a first common terminal, the second terminal of the first switch is coupled to the first terminal of the transceiver coil. The second switch comprises a first terminal, a second terminal and a control terminal, wherein the first terminal of the second switch is coupled to the first terminal of the transceiver coil, the second terminal of the second switch is coupled to a common voltage, and the control terminal of the second switch is coupled to the second terminal of the resonant capacitor. The third switch comprises a first terminal, a second terminal and a control terminal, wherein the first terminal of the third switch is coupled to the first common terminal, and the second terminal of the third switch is coupled to the second terminal of the resonant capacitor. The fourth switch comprises a first terminal, a second terminal and a control terminal, wherein the first terminal of the fourth switch is coupled to the second terminal of the resonant capacitor, the second terminal of the fourth switch is coupled to the common voltage, and the control terminal of the fourth switch is coupled to the first terminal of the transceiver coil. The communication circuit is coupled to the first terminal of the transceiver coil and the second terminal of the resonant capacitor. The control circuit is coupled to the communication circuit, the control terminal of the first switch and the control terminal of the third switch, wherein the control circuit is for controlling the first switch and the third switch.

In an energy output mode, the first common terminal receives a power voltage and the control circuit disables the communication circuit and controls the first switch and the third switch to output the electromagnetic energy. In an energy receiving mode, the control circuit controls the first switch and the third switch as a single-directional conduction elements to perform rectifier to output a rectified voltage to the first common terminal, in addition, the control circuit controls the communication circuit outputting an energy requirement signal through the transceiver coil according to amount of received energy, such that the communication circuit can request an energy requirement to an external energy providing circuit.

The present invention provides a device with both functions of wireless power transmitter and wireless power receiver. The device with both functions of wireless power transmitter and wireless power receiver comprises a transceiver coil, a resonant capacitor, a first switch, a second switch, a third switch, a fourth switch, a communication circuit, a control circuit and a battery circuit. The transceiver coil comprises a first terminal and a second terminal. The resonant capacitor comprises a first terminal and a second terminal, wherein the first terminal of the resonant capacitor is coupled to the second terminal of the transceiver coil. The first switch comprises a first terminal, a second terminal and a control terminal, wherein the first terminal of the first switch is coupled to a first common terminal, the second terminal of the first switch is coupled to the first terminal of the transceiver coil. The second switch comprises a first terminal, a second terminal and a control terminal, wherein the first terminal of the second switch is coupled to the first terminal of the transceiver coil, the second terminal of the second switch is coupled to a common voltage, and the control terminal of the second switch is coupled to the second terminal of the resonant capacitor. The third switch comprises a first terminal, a second terminal and a control terminal, wherein the first terminal of the third switch is coupled to the first common terminal, and the second terminal of the third switch is coupled to the second terminal of the resonant capacitor. The fourth switch comprises a first terminal, a second terminal and a control terminal, wherein the first terminal of the fourth switch is coupled to the second terminal of the resonant capacitor, the second terminal of the fourth switch is coupled to the common voltage, and the control terminal of the fourth switch is coupled to the first terminal of the transceiver coil. The communication circuit is coupled to the first terminal of the transceiver coil and the second terminal of the resonant capacitor. The control circuit is coupled to the communication circuit, the control terminal of the first switch and the control terminal of the third switch, wherein the control circuit is for controlling the first switch and the third switch. The battery circuit comprises a positive terminal and a negative terminal, wherein the negative terminal outputs the common voltage, and the positive terminal outputs a power voltage.

In an energy output mode, the first common terminal receives a power voltage and the control circuit disables the communication circuit and controls the first switch and the third switch to output the electromagnetic energy. In an energy receiving mode, the control circuit controls the first switch and the third switch as a single-directional conduction elements to perform rectifier to output a rectified voltage to the first common terminal, in addition, the control circuit controls the communication circuit outputting an energy requirement signal through the transceiver coil according to amount of received energy, such that the communication circuit can request an energy requirement to an external energy providing circuit.

According to the circuit with both functions of wireless power transmitter and wireless power receiver and the device thereof in a preferred embodiment of the present invention, the communication circuit comprises a first communication capacitor, a second communication capacitor, a first communication switch and a second communication switch. The first communication capacitor comprises a first terminal and a second terminal, wherein the first terminal of the first communication capacitor is coupled to the first terminal of the transceiver coil. The second communication capacitor comprises a first terminal and a second terminal, wherein the first terminal of the second communication capacitor is coupled to the second terminal of the resonant capacitor. The first communication switch comprises a first terminal, a second terminal and a control terminal, wherein the first terminal of the first communication switch is coupled to the second terminal of the first communication capacitor, the second terminal of the first communication switch is coupled to the common voltage, and the control terminal of the first communication switch is coupled to the control circuit. The second communication switch comprises a first terminal, a second terminal and a control terminal, wherein the first terminal of the second communication switch is coupled to the second terminal of the second communication capacitor, the second terminal of the second communication switch is coupled to the common voltage, and the control terminal of the second communication switch is coupled to the control circuit.

According to the circuit with both functions of wireless power transmitter and wireless power receiver and the device thereof in a preferred embodiment of the present invention, the circuit further comprises a first rectifier diode and a second rectifier diode. The first rectifier diode comprises an anode terminal and a cathode terminal, wherein the anode terminal of the first rectifier diode is coupled to the first terminal of the transceiver coil, and the cathode terminal of the first rectifier diode is coupled to the first common terminal. The second rectifier diode comprises an anode terminal and a cathode terminal, wherein the anode terminal of the second rectifier diode is coupled to the second terminal of the resonant capacitor, and the cathode terminal of the second rectifier diode is coupled to the first common terminal. In a preferred embodiment of the present invention, the circuit further comprises an energy detection circuit. The energy detection circuit comprises an input terminal and an output terminal, wherein the input terminal of the energy detection circuit is coupled to the second terminal of the transceiver coil and the first terminal of the resonant capacitor, and the output terminal of the energy detection circuit is coupled to the control circuit. When the circuit with both functions of wireless power transmitter and wireless power receiver is started up and the energy detection circuit detects an energy on the input terminal of the energy detection circuit, the control circuit controls the circuit with both functions of wireless power transmitter and wireless power receiver to enter the energy receiving mode. In the energy output mode, and the energy detection circuit detects that the voltage of the input terminal is in an over-voltage condition, the control circuit controls the circuit with both functions of wireless power transmitter and wireless power receiver enters a protection mode, and stop switching the first switch and the third switch.

The present invention further provides a circuit with both functions of wireless power transmitter and wireless power receiver. The circuit with both functions of wireless power transmitter and wireless power receiver comprises a transceiver coil, a resonant capacitor, a first switch, a second switch, a third switch, a fourth switch, a communication circuit and a control circuit. The transceiver coil comprises a first terminal and a second terminal. The resonant capacitor comprises a first terminal and a second terminal, wherein the first terminal of the resonant capacitor is coupled to the second terminal of the transceiver coil. The first switch comprises a first terminal, a second terminal and a control terminal, wherein the first terminal of the first switch is coupled to a first common terminal, the second terminal of the first switch is coupled to the first terminal of the transceiver coil. The second switch comprises a first terminal, a second terminal and a control terminal, wherein the first terminal of the second switch is coupled to the first terminal of the transceiver coil, and the second terminal of the second switch is coupled to a common voltage. The third switch comprises a first terminal, a second terminal and a control terminal, wherein the first terminal of the third switch is coupled to the first common terminal, and the second terminal of the third switch is coupled to the second terminal of the resonant capacitor. The fourth switch comprises a first terminal, a second terminal and a control terminal, wherein the first terminal of the fourth switch is coupled to the second terminal of the resonant capacitor, and the second terminal of the fourth switch is coupled to the common voltage. The communication circuit is coupled to the first terminal of the transceiver coil and the second terminal of the resonant capacitor. The control circuit is coupled to the communication circuit, the control terminal of the first switch, the control terminal of the second switch, the control terminal of the third switch and the control terminal of the fourth switch, wherein the control circuit is for controlling the first switch, the second switch, the third switch and the fourth switch.

In an energy output mode, the first common terminal receives a power voltage and the control circuit disables the communication circuit and controls the first switch, the second switch, the third switch and the fourth switch to output the electromagnetic energy. In an energy receiving mode, the control circuit controls the first switch, the second switch, the third switch and the fourth switch as a single-directional conduction elements to perform rectifier to output a rectified voltage to the first common terminal, in addition, the control circuit controls the communication circuit outputting an energy requirement signal through the transceiver coil according to amount of received energy, such that the communication circuit can request an energy requirement to an external energy providing circuit.

According to the circuit with both functions of wireless power transmitter and wireless power receiver and the device thereof in a preferred embodiment of the present invention, the circuit further comprises a first rectifier diode, a second rectifier diode, a third rectifier diode and a fourth rectifier diode. The first rectifier diode comprises an anode terminal and a cathode terminal, wherein the anode terminal of the first rectifier diode is coupled to the first terminal of the transceiver coil, and the cathode terminal of the first rectifier diode is coupled to the first common terminal. The second rectifier diode comprises an anode terminal and a cathode terminal, wherein the anode terminal of the second rectifier diode is coupled to the second terminal of the resonant capacitor, and the cathode terminal of the second rectifier diode is coupled to the first common terminal. The third rectifier diode comprises an anode terminal and a cathode terminal, wherein the anode terminal of the third rectifier diode is coupled to the common voltage, and the cathode terminal of the third rectifier diode is coupled to the first terminal of the transceiver coil. The fourth rectifier diode comprises an anode terminal and a cathode terminal, wherein the anode terminal of the fourth rectifier diode is coupled to the common voltage, and the cathode terminal of the fourth rectifier diode is coupled to the second terminal of the resonant capacitor.

The spirit of the present invention is to provide a device with both functions of wireless power transmitter and wireless power receiver which uses only one coil. In order to use this coil to have two functions, a full bridge circuit is adopted. However, two gates of the two lower switches are controlled by the resonant circuit in the energy receiving mode. The upper switches is not only for receiving the power voltage, but for rectifying the voltage receiving from the coil to output to the device with both functions of wireless power transmitter and wireless power receiver. Since the present invention only need one coil to be served as an energy transmitter and an energy receiver, one coil and its peripheral elements can be saved.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
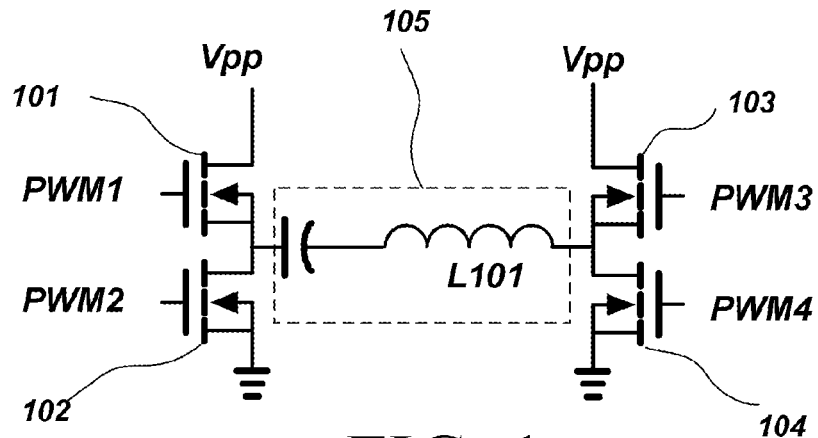
FIG. 1 illustrates a circuit diagram of a wireless power transmitter disclosed by the Wireless Power Consortium.
Figure 2:
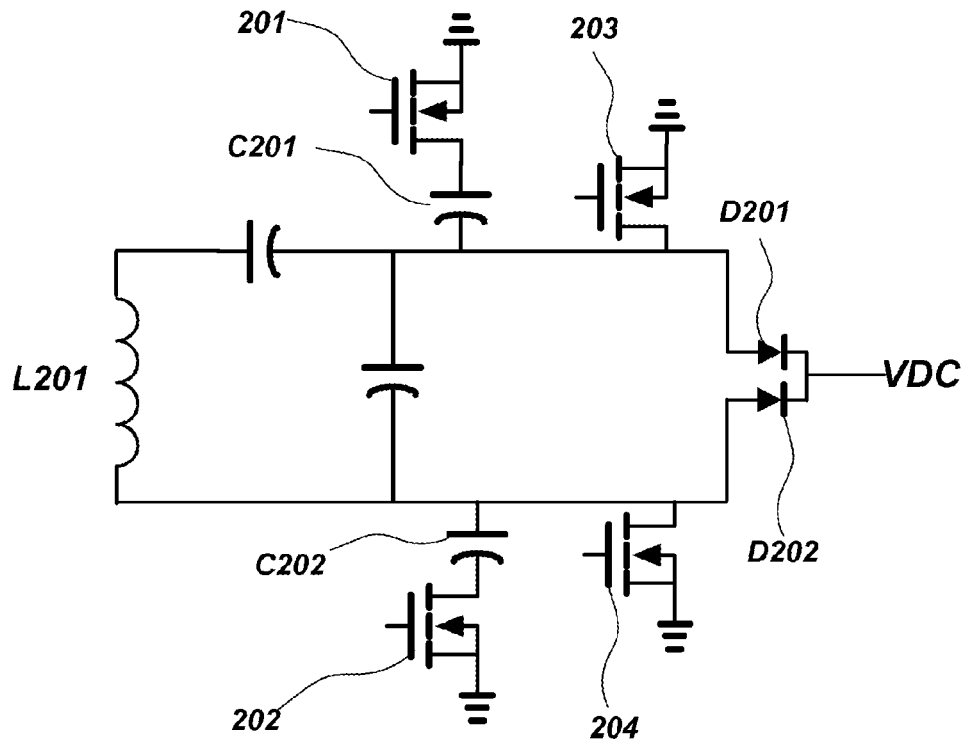
FIG. 2 illustrates a circuit diagram of a wireless power receiver disclosed by the Wireless Power Consortium.
Figure 3:
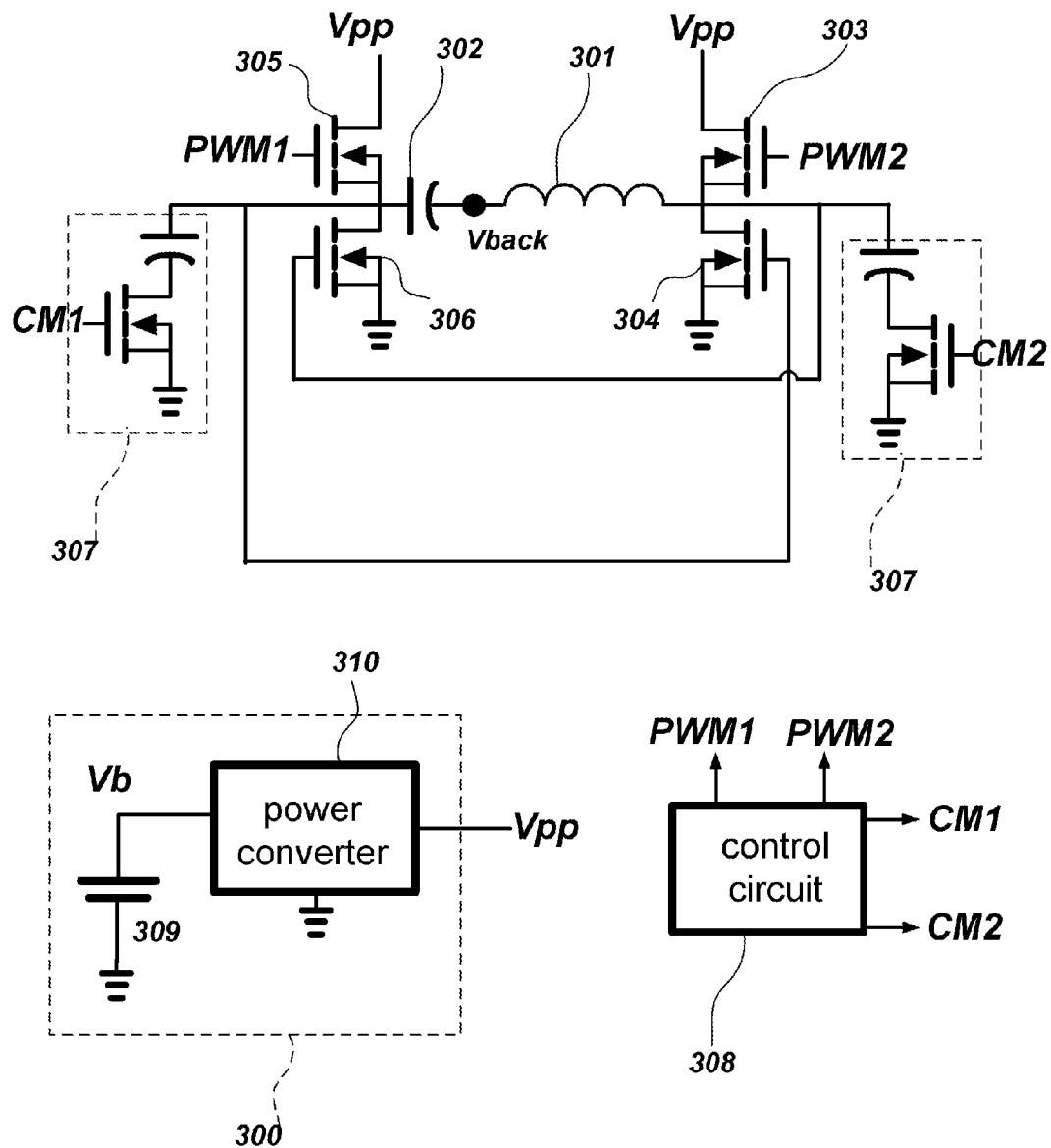
FIG. 3 illustrates a circuit diagram depicting a device with both functions of wireless power transmitter and wireless power receiver according to a preferred embodiment of the present invention.

FIG. 3 illustrates a circuit diagram depicting a device with both functions of wireless power transmitter and wireless power receiver according to a preferred embodiment of the present invention. Referring to FIG. 3, the device with both functions of wireless power transmitter and wireless power receiver includes a battery circuit 300, a transceiver coil 301, a resonant capacitor 302, a first switch 303, a second switch 304, a third switch 305, a fourth switch 306, a communication circuit 307 and a control circuit 308. The battery circuit 300 includes a battery 309 and a power converter 310, the battery 309 is generally for providing a 3.7V power Vb. The power converter 310 is for converting 3.7V to the power voltage, which is generally 5V, and transmitting the power voltage to the power node Vpp. As shown in the circuit of FIG. 3, when the circuit is served as the wireless power transmitter, the first switch 303, the second switch 304, the third switch 305 and the fourth switch 306 forms a full bridge converter. The communication circuit 307 is formed by two switches and two capacitors.

First, it is assumed that the device with both functions of wireless power transmitter and wireless power receiver is a mobile power bank with both functions of wireless power transmitter and wireless power receiver. In addition, when the mobile power bank is operated in the wireless power output mode, the mobile power bank is used for charging an external mobile device. When the mobile power bank is operated in the wireless power output mode, the communication circuit 307 is inactivated. In other words, the first communication signal CM1 and the second communication signal CM2 are in logic low voltage. Further, the control circuit 308 respectively outputs the first pulse width modulation (PWM) signal PWM1 and the second PWM signal PWM2 to respectively control the first switch 303 and the third switch 305. The first PWM signal PWM1 and the second PWM signal PWM2 have inverted phase from each other. Thus, when the first PWM signal PWM1 is in logic high voltage state, the second PWM signal PWM2 is in logic low voltage state.

When the device starts to operate, the first PWM signal PWM1 is logic high voltage. At this time, the third switch 305 is turned on, and the power voltage on the power node Vpp is conducted to the gate of the second switch 304 such that the second switch 304 is turned on. Next, the first PWM signal PWM1 is logic low voltage, and the second PWM signal PWM2 is converted to the logic high voltage from the logic low voltage. At this time, the third switch 305 and the second switch 304 are turned off, and the first switch 303 is turned on. The power voltage is conducted to the gate terminal of the fourth switch 306 from the power node Vpp such that the fourth switch is turned on. Thus, the control circuit 308 can control the frequency of the input signal of the transceiver coil 301 and the resonant capacitor 302 and its output energy outputted to an external object.

Moreover, it is assumed that the mobile power bank is served as the wireless power receiver, that is, the mobile power bank is operated in wireless power receiving mode. At this time, the control circuit 308 sets the first PWM signal PWM1 and the second PWM signal PWM2 to the logic low voltage. Thus, the first switch 303 and the third switch 305 is inactivated. Since the body terminals of the first switch 303 and the third switch 305 are correspondingly coupled to the second source/drain terminals of the first switch 303 and the third switch 305, the first switch 303 and the third switch 305 can be seen as diodes, wherein the anode of the first switch 303 is coupled to the transceiver coil 301, and the anode of the third switch 305 is coupled to the resonant capacitor 302.

When the device is operated in wireless power receiving mode, the first PWM signal PWM1 and the second PWM signal PWM2 are logic low voltage. At this time, the first switch 303 and the third switch 305 can be seen as the rectifier diodes. The transceiver coil 301 receives the external energy such that the circuit of the transceiver coil 301, the resonant capacitor 302, the second switch 304 and the fourth switch 306 begin to resonate. The AC energy generated by the resonance is transmitted to the power node Vpp through the rectifier implemented by the first switch 303 and the third switch 305. Moreover, the control circuit 308 detects the amount of the received energy, and controls the communication circuit 307 to report it to the external wireless power transmitter through the first communication signal CM1 and the second communication signal CM2 to inform the external wireless power transmitter to increase or to decrease its output electromagnetic energy. Further, the energy rectified by the first switch 303 and the third switch 305 is converted by the power converter 310 such that the battery 309 can be charged.

According to the abovementioned circuit, it can be observed that the device with both functions of wireless power transmitter and wireless power receiver adopts one coil to perform transmitting and receiving wireless power.

Figure 4:
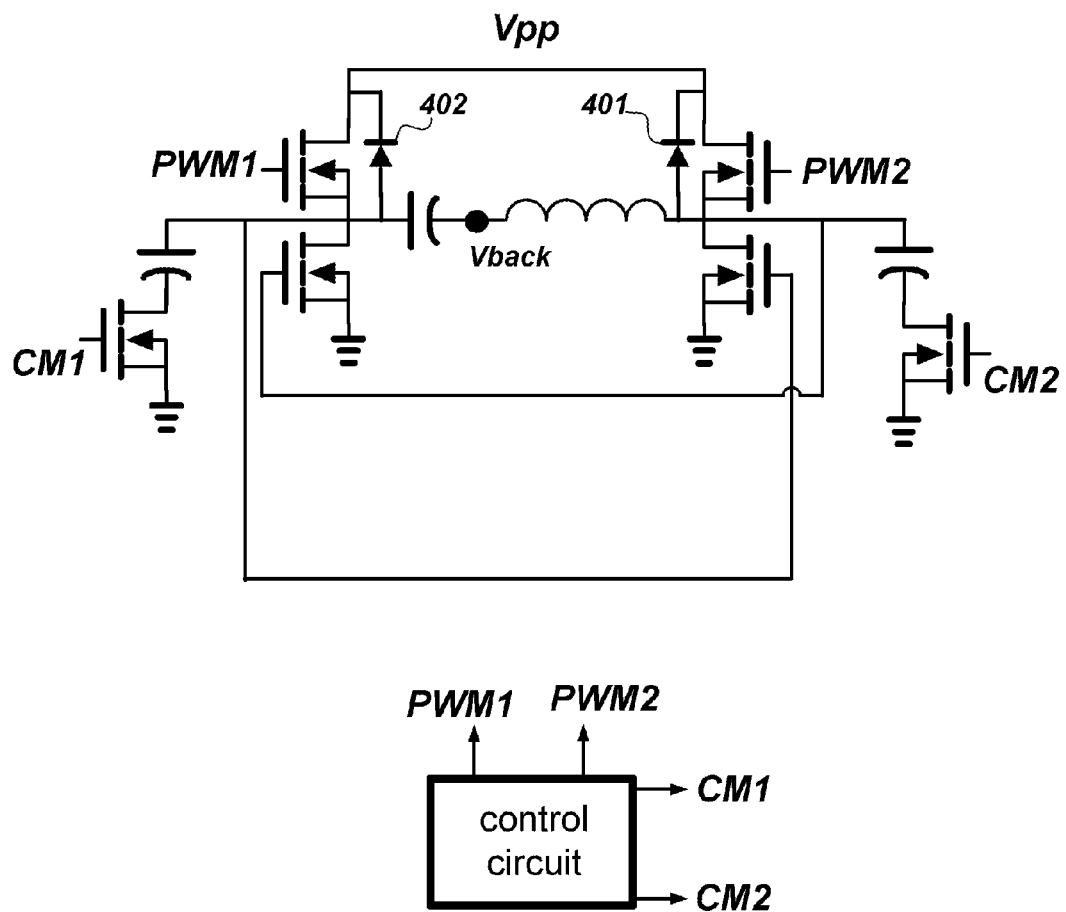
FIG. 4 illustrates a circuit diagram depicting a device with both functions of wireless power transmitter and wireless power receiver according to a preferred embodiment of the present invention.

FIG. 4 illustrates a circuit diagram depicting a device with both functions of wireless power transmitter and wireless power receiver according to a preferred embodiment of the present invention. Referring to FIG. 4, in the circuit diagram of the device with both functions of wireless power transmitter and wireless power receiver, it is additionally illustrated a first rectifier diode 401 and a second rectifier diode 402. Since the cut-in voltage of the first switch 303 and the third switch 305 is higher than the cut-in voltage of diode when the first switch 303 and the third switch 305 is served as diodes, it causes extra power consumption. Thus, the first rectifier diode 401 and a second rectifier diode 402 are respectively disposed between the first drain/source terminal and the second drain/source terminal of the first switch 303 and the third switch 305. As such, the power consumption can be reduced and the efficiency of the circuit can be increased.

Figure 5:
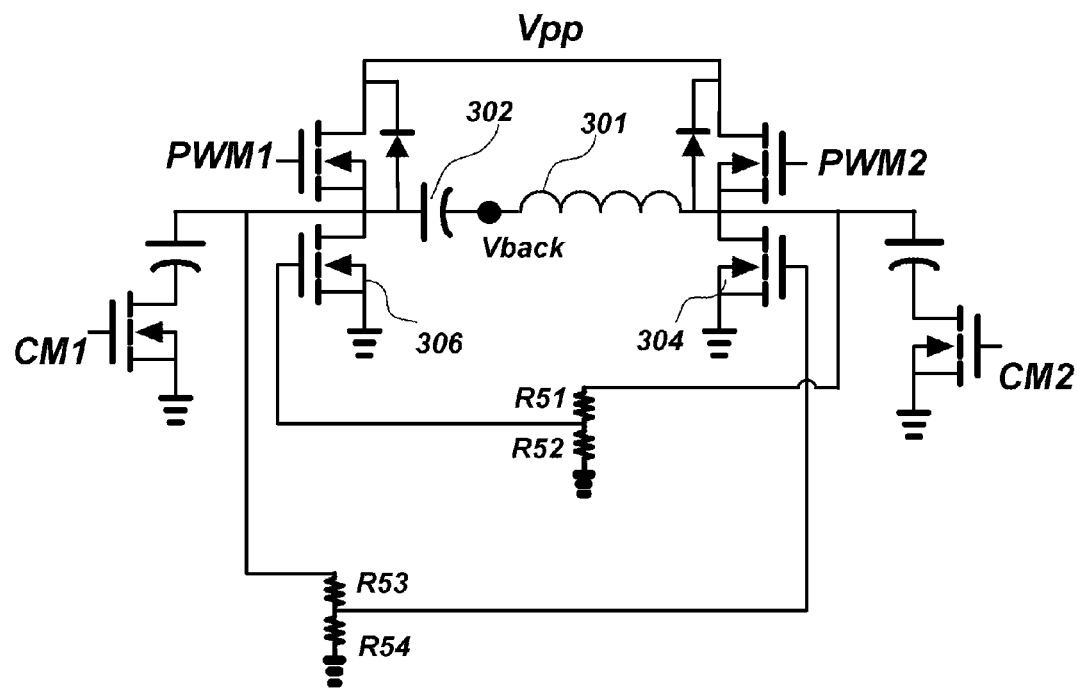
FIG. 5 illustrates a circuit diagram depicting a device with both functions of wireless power transmitter and wireless power receiver according to a preferred embodiment of the present invention.
Figure 5:
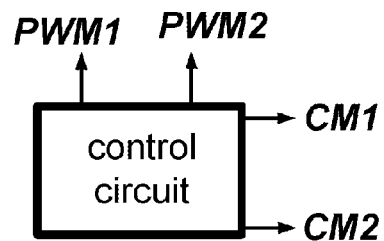

FIG. 5 illustrates a circuit diagram depicting a device with both functions of wireless power transmitter and wireless power receiver according to a preferred embodiment of the present invention. Referring to FIG. 5, in this embodiment, a first voltage divider is disposed between the second switch 304 and the resonant capacitor 302. Similarly, a second voltage divider is disposed between the fourth switch 306 and the transceiver coil 301. The first voltage divider is implemented by the voltage dividing resistors R53 and R54. The second voltage divider is implemented by the voltage dividing resistors R51 and R52. The first voltage divider and the second voltage divider can be used to protect the second switch 304 and the fourth switch 306 to prevent the damage of the second switch 304 and the fourth switch 306. Since the operation of the device in FIG. 5 is the same of those in FIGS. 3 and 4, the detail description is omitted.

Figure 6:
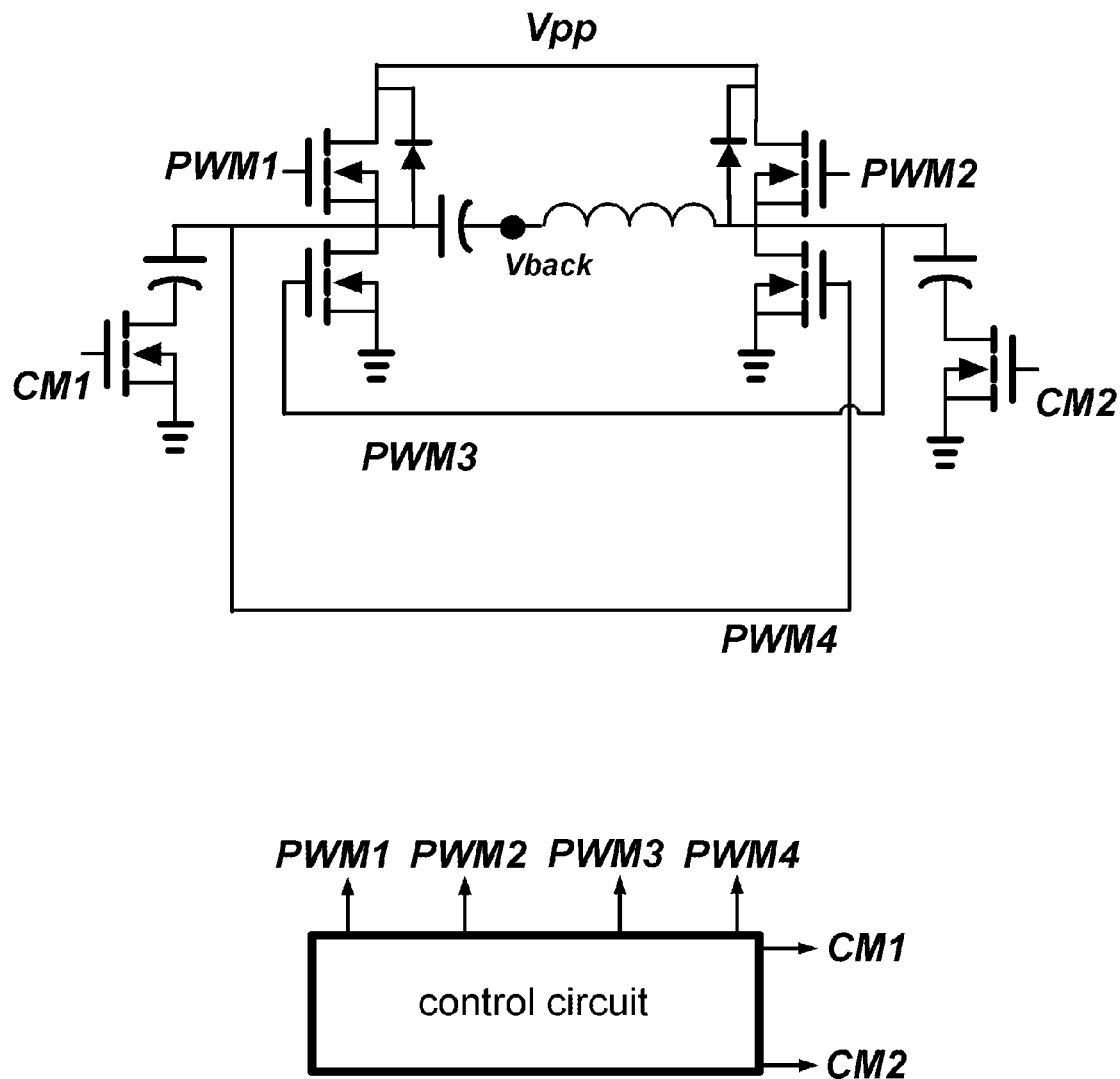
FIG. 6 illustrates a circuit diagram depicting a device with both functions of wireless power transmitter and wireless power receiver according to a preferred embodiment of the present invention.

FIG. 6 illustrates a circuit diagram depicting a device with both functions of wireless power transmitter and wireless power receiver according to a preferred embodiment of the present invention. Referring to FIG. 6 and FIG. 4, the difference between the circuit in FIG. 6 and the circuit in FIG. 4 is that the control circuit outputs not only the first PWM signal PWM1 and the second PWM signal PWM2, but also the third PWM signal PWM3 and the fourth PWM signal PWM4, wherein the third PWM signal PWM3 is for controlling the fourth switch 306, and the fourth PWM signal PMW4 is used for controlling the second switch 304. Moreover, the third PWM signal PWM3 and the second PWM signal PWM2 are in-phase, and the fourth PWM signal PWM4 and the first PWM signal PWM1 are in-phase.

Figure 7:
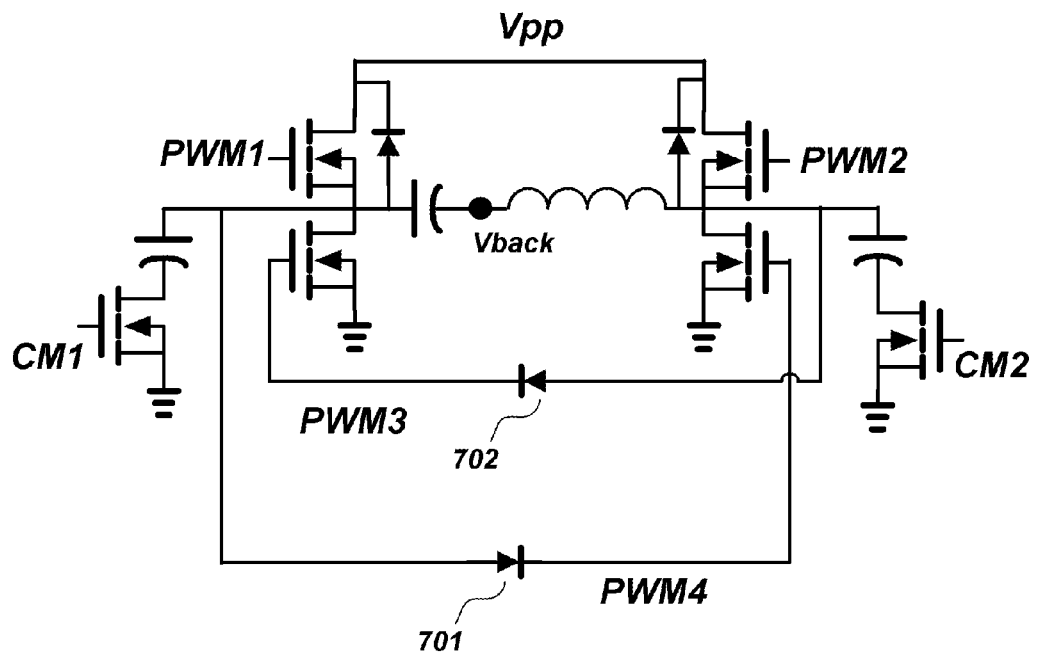
FIG. 7 illustrates a circuit diagram depicting a device with both functions of wireless power transmitter and wireless power receiver according to a preferred embodiment of the present invention.
Figure 7:
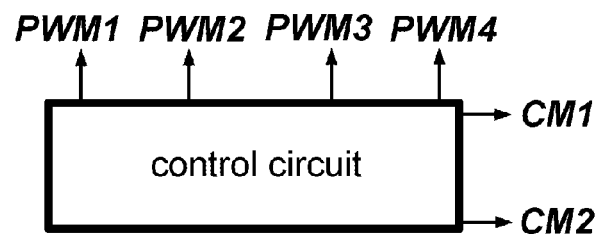

FIG. 7 illustrates a circuit diagram depicting a device with both functions of wireless power transmitter and wireless power receiver according to a preferred embodiment of the present invention. Referring to FIG. 7 and FIG. 6, the difference between the circuit in FIG. 7 and the circuit in FIG. 6 is that a first isolation diode 701 and a second isolation diode 702 is disposed in the circuit in FIG. 7. Since the operation of the circuit in FIG. 7 is the same as the operation of the circuit in FIG. 6, the detail description is omitted.

Figure 8:
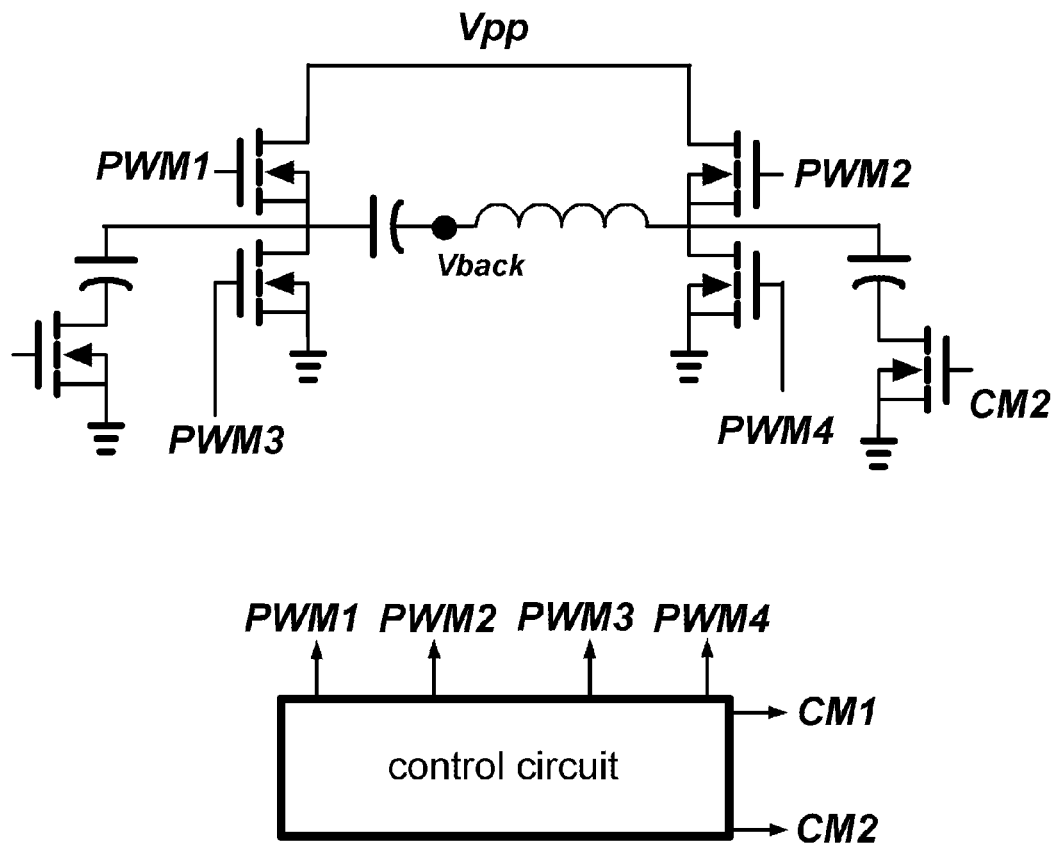
FIG. 8 illustrates a circuit diagram depicting a device with both functions of wireless power transmitter and wireless power receiver according to a preferred embodiment of the present invention.

FIG. 8 illustrates a circuit diagram depicting a device with both functions of wireless power transmitter and wireless power receiver according to a preferred embodiment of the present invention. Referring to FIG. 8 and FIG. 3, the difference between the circuit in FIG. 8 and the circuit in FIG. 3 is that the gate terminals of the first switch 303, the second switch 304, the third switch 305 and the fourth switch 306 are coupled to the control circuit 308, wherein the gate terminal of the second switch 304 is not coupled to the resonant capacitor 302 and the gate terminal of the fourth switch 306 is not coupled to the transceiver coil 301. When the mobile power bank is operated in the wireless power output mode, the control circuit outputs not only the first PWM signal PWM1 and the second PWM signal PWM2, but also the third PWM signal PWM3 and the fourth PWM signal PWM4, wherein the third PWM signal PWM3 is for controlling the fourth switch 306, and the fourth PWM signal PMW4 is used for controlling the second switch 304. Moreover, the third PWM signal PWM3 and the second PWM signal PWM2 are in-phase, and the fourth PWM signal PWM4 and the first PWM signal PWM1 are in-phase.

When the mobile power bank is operated in wireless power receiving mode, the control circuit 308 sets the first PWM signal PWM1, the second PWM signal PWM2, the third PWM signal PWM3, and the fourth PWM signal PWM4 as logic low voltage. Thus, the first switch 303, the second switch 304, the third switch 305 and the fourth switch 306 are inactivated. Since the body terminals of the first switch 303, the second switch 304, the third switch 305 and the fourth switch 306 are correspondingly coupled to the second source/drain terminals of the first switch 303, the second switch 304, the third switch 305 and the fourth switch 306, the first switch 303, the second switch 304, the third switch 305 and the fourth switch 306 can be seen as diodes. As such, the first switch 303, the second switch 304, the third switch 305 and the fourth switch 306 can be used for rectifying the received energy of the transceiver coil 301 and the resonant capacitor 302.

Figure 9:
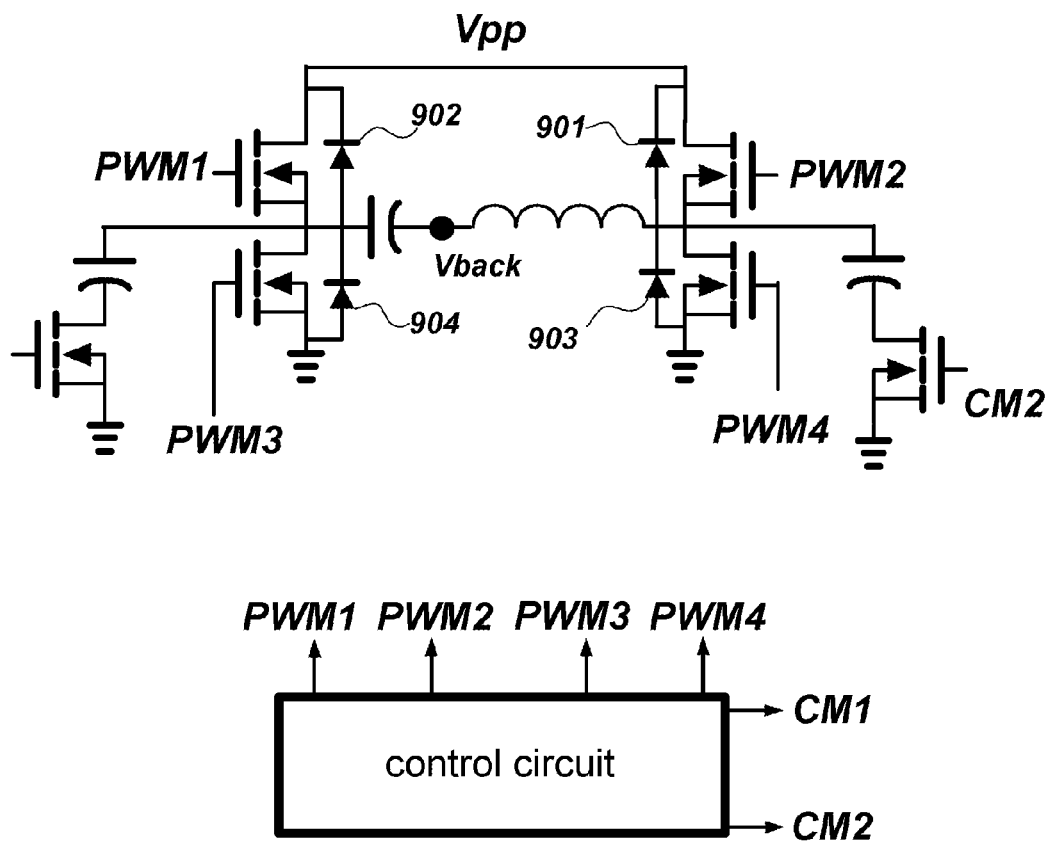
FIG. 9 illustrates a circuit diagram depicting a device with both functions of wireless power transmitter and wireless power receiver according to a preferred embodiment of the present invention.

FIG. 9 illustrates a circuit diagram depicting a device with both functions of wireless power transmitter and wireless power receiver according to a preferred embodiment of the present invention. Referring to FIG. 9 and FIG. 8, the difference between the circuit in FIG. 9 and the circuit in FIG. 8 is that the first rectifier diode 901, the second rectifier diode 902, the third rectifier diode 903 and the fourth rectifier diode 904 are added in the circuit in FIG. 9. Because the cut-in voltage of the first switch 303, the second switch 304, the third switch 305 and the fourth switch 306 is higher than the cut-in voltage of diode when the first switch 303, the second switch 304, the third switch 305 and the fourth switch 306 are served as diodes, it causes extra power consumption. Thus, the first rectifier diode 901, the second rectifier diode 902, the third rectifier diode 903 and the fourth rectifier diode 904 are respectively disposed between the first drain/source terminal and the second drain/source terminal of the first switch 303, the second switch 304, the third switch 305 and the fourth switch 306. As such, the power consumption can be reduced and the efficiency of the circuit can be increased.

Figure 10:
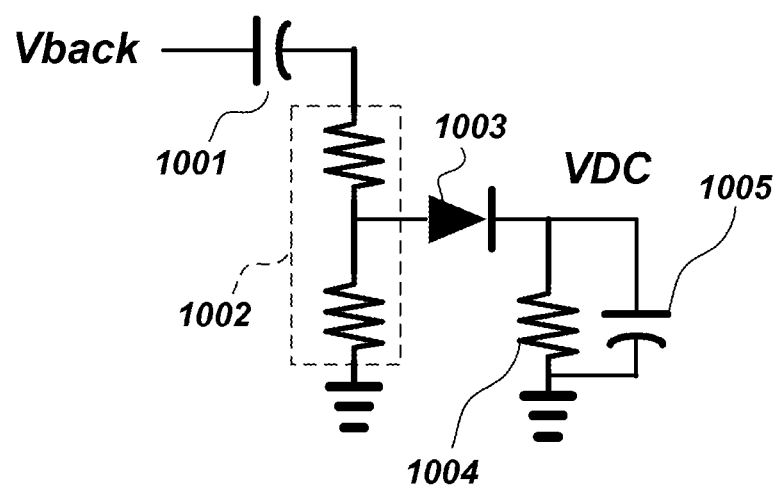
FIG. 10 illustrates a circuit diagram depicting the energy detection circuit of the device with both functions of wireless power transmitter and wireless power receiver according to a preferred embodiment of the present invention.

FIG. 10 illustrates a circuit diagram depicting the energy detection circuit of the device with both functions of wireless power transmitter and wireless power receiver according to a preferred embodiment of the present invention. Referring to FIG. 10, the energy detection circuit is coupled to the node Vback between the transceiver coil 301 and the resonant capacitor 302 in FIG. 3, FIG. 4, FIG. 5, FIG. 6, FIG. 7, FIG. 8 and FIG. 9. The energy detection circuit includes a DC-blocking capacitor 1001, a voltage divider 1002, a diode 1003, a discharging resistor 1004 and a sampling capacitor 1005. The DC-blocking capacitor 1001 is used for blocking the DC voltage. The voltage divider 1002 is used for dividing the voltage of another terminal of the DC-blocking capacitor 1001. The diode 1003 is used for rectifier. The sampling capacitor 1005 is used for sampling the DC voltage of the rectified voltage by the diode 1003. The discharging resistor 1004 is used for discharging the voltage of the sampling capacitor 1005.

According to the circuit diagram of the energy detection circuit, people having ordinary skill in the art should know that the energy detection circuit is mainly used for sampling the DC voltage of the resonant circuit which is implemented by the transceiver coil 301 and the resonant capacitor. The DC voltage VDC has different meanings in different operation mode. When the device with both functions of wireless power transmitter and wireless power receiver is served as the wireless power receiver, the DC voltage VDC represents the energy on the transceiver coil 301. When the device with both functions of wireless power transmitter and wireless power receiver is served as the wireless power transmitter, the DC voltage VDC represents the output energy.

Therefore, the energy detection circuit has two functions. When the device with both functions of wireless power transmitter and wireless power receiver starts up and the energy detection circuit detects that the node Vback has energy, the control circuit 308 controls the device with both functions of wireless power transmitter and wireless power receiver to enter the energy receiving mode to charge the battery 309. In addition, when the device with both functions of wireless power transmitter and wireless power receiver is in the energy output mode, and the energy detection circuit detects the over-voltage at the node Vback, it represents that the external wireless power receiver requires too much power. If the operation continues, it may cause the damage of the external plastic case or the circuit by the increasing temperature. Accordingly, the control circuit 308 controls the device with both functions of wireless power transmitter and wireless power receiver to enter a protection mode. And the first PWM signal PWM1 and the second PWM signal PWM2 are disabled to stop switching the first switch 303 and the third switch 305. Thus, the damage of the circuit can be prevented.

In summary, the spirit of the present invention is to provide a device with both functions of wireless power transmitter and wireless power receiver that uses only one coil. In order to use this coil to have two functions, a full bridge circuit is adopted. However, two gates of the two lower switches are controlled by the resonant circuit in the energy receiving mode. The upper switches is not only for receiving the power voltage, but for rectifying the voltage receiving from the coil to output to the device with both functions of wireless power transmitter and wireless power receiver. Since the present invention only need one coil to be served as an energy transmitter and an energy receiver, one coil and its peripheral elements can be saved.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A circuit with both functions of wireless power transmitter and wireless power receiver, comprising:
    a transceiver coil, comprising a first terminal and a second terminal;
    a resonant capacitor, comprising a first terminal and a second terminal, wherein the first terminal of the resonant capacitor is coupled to the second terminal of the transceiver coil
    a first switch, comprising a first terminal, a second terminal and a control terminal, wherein the first terminal of the first switch is coupled to a first common terminal, the second terminal of the first switch is coupled to the first terminal of the transceiver coil;
a second switch, comprising a first terminal, a second terminal and a control terminal, wherein the first terminal of the second switch is coupled to the first terminal of the transceiver coil, the second terminal of the second switch is coupled to a common voltage, and the control terminal of the second switch is coupled to the second terminal of the resonant capacitor; a third switch, comprising a first terminal, a second terminal and a control terminal, wherein the first terminal of the third switch is coupled to the first common terminal, and the second terminal of the third switch is coupled to the second terminal of the resonant capacitor;
a fourth switch, comprising a first terminal, a second terminal and a control terminal, wherein the first terminal of the fourth switch is coupled to the second terminal of the resonant capacitor, the second terminal of the fourth switch is coupled to the common voltage, and the control terminal of the fourth switch is coupled to the first terminal of the transceiver coil;
a communication circuit, coupled to the first terminal of the transceiver coil and the second terminal of the resonant capacitor; and
a control circuit, coupled to the communication circuit, the control terminal of the first switch and the control terminal of the third switch, wherein the control circuit is for controlling the first switch and the third switch,
wherein in an energy output mode, the first common terminal receives a power voltage and the control circuit disables the communication circuit and controls the first switch and the third switch to output electromagnetic energy,
wherein in an energy receiving mode, the control circuit controls the first switch and the third switch as single-directional conduction elements to perform rectifier to output a rectified voltage to the first common terminal, in addition, the control circuit controls the communication circuit outputting an energy requirement signal through the transceiver coil according to an amount of received energy, such that the communication circuit can request an energy requirement from an external energy providing circuit.

2. The circuit with both functions of wireless power transmitter and wireless power receiver according to claim 1, wherein the communication circuit comprises:
a first communication capacitor, comprising a first terminal and a second terminal, wherein the first terminal of the first communication capacitor is coupled to the first terminal of the transceiver coil;
a second communication capacitor, comprising a first terminal and a second terminal, wherein the first terminal of the second communication capacitor is coupled to the second terminal of the resonant capacitor;
a first communication switch, comprising a first terminal, a second terminal and a control terminal, wherein the first terminal of the first communication switch is coupled to the second terminal of the first communication capacitor, the second terminal of the first communication switch is coupled to the common voltage, and the control terminal of the first communication switch is coupled to the control circuit; and
a second communication switch, comprising a first terminal, a second terminal and a control terminal, wherein the first terminal of the second communication switch is coupled to the second terminal of the second communication capacitor, the second terminal of the second communication switch is coupled to the common voltage, and the control terminal of the second communication switch is coupled to the control circuit.

3. The circuit with both functions of wireless power transmitter and wireless power receiver according to claim 1, further comprising:
a first rectifier diode, comprising an anode terminal and a cathode terminal, wherein the anode terminal of the first rectifier diode is coupled to the first terminal of the transceiver coil, and the cathode terminal of the first rectifier diode is coupled to the first common terminal; and
a second rectifier diode, comprising an anode terminal and a cathode terminal, wherein the anode terminal of the second rectifier diode is coupled to the second terminal of the resonant capacitor, and the cathode terminal of the second rectifier diode is coupled to the first common terminal.

4. The circuit with both functions of wireless power transmitter and wireless power receiver according to claim 1, further comprising:
an energy detection circuit, comprising an input terminal and an output terminal, wherein the input terminal of the energy detection circuit is coupled to the second terminal of the transceiver coil and the first terminal of the resonant capacitor, and the output terminal of the energy detection circuit is coupled to the control circuit,
wherein when the circuit with both functions of wireless power transmitter and wireless power receiver is started up and the energy detection circuit detects an energy on the input terminal of the energy detection circuit, the control circuit controls the circuit with both functions of wireless power transmitter and wireless power receiver to enter the energy receiving mode.

5. The circuit with both functions of wireless power transmitter and wireless power receiver according to claim 4, wherein the energy detection circuit comprises:
a DC-blocking capacitor, comprising a first terminal and a second terminal, wherein the first terminal of the DC-blocking capacitor is coupled to the input terminal of the energy detection circuit;
a voltage divider, comprising an input terminal and an output terminal, wherein the input terminal of the voltage divider is coupled to the second terminal of the DC-blocking capacitor, and the output terminal of the voltage divider outputs a divided voltage;
a diode, comprising an anode terminal and a cathode terminal, wherein the anode terminal of the diode is coupled to the output terminal of the voltage divider to receive the divided voltage;
a sampling capacitor, comprising a first terminal and a second terminal, wherein the first terminal of the sampling capacitor is coupled to the cathode terminal of the diode, and the second terminal of the sampling capacitor is coupled to the common voltage; and
a discharging resistor, comprising a first terminal and a second terminal, wherein the first terminal of the discharging capacitor is coupled to the first terminal of the sampling capacitor, and the second terminal of the discharging capacitor is coupled to the second terminal of the sampling capacitor.

6. The circuit with both functions of wireless power transmitter and wireless power receiver according to claim 1, further comprising:

an energy detection circuit, comprising an input terminal and an output terminal, wherein the input terminal of the energy detection circuit is coupled to the second terminal of the transceiver coil and the first terminal of the resonant capacitor, and the output terminal of the energy detection circuit is coupled to the control circuit, wherein in the energy output mode, and the energy detection circuit detects that the voltage of the input terminal is in an over-voltage condition, the control circuit controls the circuit with both functions of wireless power transmitter and wireless power receiver enters a protection mode, and stop switching the first switch and the third switch.

7. The circuit with both functions of wireless power transmitter and wireless power receiver according to claim 1, wherein the control circuit is further coupled to the control terminal of the second switch and the control terminal of the fourth switch, and the circuit with both functions of wireless power transmitter and wireless power receiver further comprises:
 a first isolation diode, comprising an anode terminal and a cathode terminal, wherein the anode terminal of the first isolation diode is coupled to the second terminal of the resonant capacitor, and the cathode terminal of the first isolation diode is coupled to the control terminal of the second switch and the control circuit; and
 a second isolation diode, comprising an anode terminal and a cathode terminal, wherein the anode terminal of the second isolation diode is coupled to the first terminal of the transceiver coil, and the cathode terminal of the second isolation diode is coupled to the control terminal of the fourth switch and the control circuit.

8. A device with both functions of wireless power transmitter and wireless power receiver, comprising:
 a transceiver coil, comprising a first terminal and a second terminal;
 a resonant capacitor, comprising a first terminal and a second terminal, wherein the first terminal of the resonant capacitor is coupled to the second terminal of the transceiver coil a first switch, comprising a first terminal, a second terminal and a control terminal, wherein the first terminal of the first switch is coupled to a first common terminal, the second terminal of the first switch is coupled to the first terminal of the transceiver coil;
 a second switch, comprising a first terminal, a second terminal and a control terminal, wherein the first terminal of the second switch is coupled to the first terminal of the transceiver coil, the second terminal of the second switch is coupled to a common voltage, and the control terminal of the second switch is coupled to the second terminal of the resonant capacitor;
 a third switch, comprising a first terminal, a second terminal and a control terminal, wherein the first terminal of the third switch is coupled to the first common terminal, and the second terminal of the third switch is coupled to the second terminal of the resonant capacitor;
 a fourth switch, comprising a first terminal, a second terminal and a control terminal, wherein the first terminal of the fourth switch is coupled to the second terminal of the resonant capacitor, the second terminal of the fourth switch is coupled to the common voltage, and the control terminal of the fourth switch is coupled to the first terminal of the transceiver coil;
 a communication circuit, coupled to the first terminal of the transceiver coil and the second terminal of the resonant capacitor; and a control circuit, coupled to the communication circuit, the control terminal of the first switch and the control terminal of the third switch, wherein the control circuit is for controlling the first switch and the third switch; and
 a battery circuit, comprising a positive terminal and a negative terminal, wherein the negative terminal of the battery circuit outputs the common voltage, and the positive terminal of the battery circuit outputs a power voltage;
 wherein in an energy output mode, the first common terminal receives the power voltage and the control circuit disables the communication circuit and controls the first switch and the third switch to output electromagnetic energy,
 wherein in an energy receiving mode, the control circuit controls the first switch and the third switch as single-directional conduction elements to perform rectifier to output a rectified voltage to the first common terminal, in addition, the control circuit controls the communication circuit outputting an enemy requirement signal through the transceiver coil according to an amount of received energy, such that the communication circuit can request an energy requirement from an external energy providing circuit.

9. The device with both functions of wireless power transmitter and wireless power receiver according to claim 8, wherein the communication circuit comprises:
 a first communication capacitor, comprising a first terminal and a second terminal, wherein the first terminal of the first communication capacitor is coupled to the first terminal of the transceiver coil;
 a second communication capacitor, comprising a first terminal and a second terminal, wherein the first terminal of the second communication capacitor is coupled to the second terminal of the resonant capacitor;
 a first communication switch, comprising a first terminal, a second terminal and a control terminal, wherein the first terminal of the first communication switch is coupled to the second terminal of the first communication capacitor, the second terminal of the first communication switch is coupled to the common voltage, and the control terminal of the first communication switch is coupled to the control circuit; and
 a second communication switch, comprising a first terminal, a second terminal and a control terminal, wherein the first terminal of the second communication switch is coupled to the second terminal of the second communication capacitor, the second terminal of the second communication switch is coupled to the common voltage, and the control terminal of the second communication switch is coupled to the control circuit.

10. The device with both functions of wireless power transmitter and wireless power receiver according to claim 8, further comprising:
 a first rectifier diode, comprising an anode terminal and a cathode terminal, wherein the anode terminal of the first rectifier diode is coupled to the first terminal of the transceiver coil, and the cathode terminal of the first rectifier diode is coupled to the first common terminal; and
 a second rectifier diode, comprising an anode terminal and a cathode terminal, wherein the anode terminal of the second rectifier diode is coupled to the second terminal of the resonant capacitor, and the cathode terminal of the second rectifier diode is coupled to the first common terminal.

11. The device with both functions of wireless power transmitter and wireless power receiver according to claim 8, further comprising:
an energy detection circuit, comprising an input terminal and an output terminal, wherein the input terminal of the energy detection circuit is coupled to the second terminal of the transceiver coil and the first terminal of the resonant capacitor, and the output terminal of the energy detection circuit is coupled to the control circuit,
wherein when the circuit with both functions of wireless power transmitter and wireless power receiver is started up and the energy detection circuit detects an energy on the input terminal of the energy detection circuit, the control circuit controls the circuit with both functions of wireless power transmitter and wireless power receiver to enter the energy receiving mode.

12. The device with both functions of wireless power transmitter and wireless power receiver according to claim 11, wherein the energy detection circuit comprises:
a DC-blocking capacitor, comprising a first terminal and a second terminal, wherein the first terminal of the DC-blocking capacitor is coupled to the input terminal of the energy detection circuit;
a voltage divider, comprising an input terminal and an output terminal, wherein the input terminal of the voltage divider is coupled to the second terminal of the DC-blocking capacitor, and the output terminal of the voltage divider outputs a divided voltage;
a diode, comprising an anode terminal and a cathode terminal, wherein the anode terminal of the diode is coupled to the output terminal of the voltage divider to receive the divided voltage;
a sampling capacitor, comprising a first terminal and a second terminal, wherein the first terminal of the sampling capacitor is coupled to the cathode terminal of the diode, and the second terminal of the sampling capacitor is coupled to the common voltage; and
a discharging resistor, comprising a first terminal and a second terminal, wherein the first terminal of the discharging capacitor is coupled to the first terminal of the sampling capacitor, and the second terminal of the discharging capacitor is coupled to the second terminal of the sampling capacitor.

13. The device with both functions of wireless power transmitter and wireless power receiver according to claim 8, further comprising:
an energy detection circuit, comprising an input terminal and an output terminal, wherein the input terminal of the energy detection circuit is coupled to the second terminal of the transceiver coil and the first terminal of the resonant capacitor, and the output terminal of the energy detection circuit is coupled to the control circuit,
wherein in the energy output mode, and the energy detection circuit detects that the voltage of the input terminal is in an over-voltage condition, the control circuit controls the circuit with both functions of wireless power transmitter and wireless power receiver enters a protection mode, and stop switching the first switch and the third switch.

14. The device with both functions of wireless power transmitter and wireless power receiver according to claim 8, wherein the control circuit is further coupled to the control terminal of the second switch and the control terminal of the fourth switch, and the circuit with both functions of wireless power transmitter and wireless power receiver further comprises:
a first isolation diode, comprising an anode terminal and a cathode terminal, wherein the anode terminal of the first isolation diode is coupled to the second terminal of the resonant capacitor, and the cathode terminal of the first isolation diode is coupled to the control terminal of the second switch and the control circuit; and
a second isolation diode, comprising an anode terminal and a cathode terminal, wherein the anode terminal of the second isolation diode is coupled to the first terminal of the transceiver coil, and the cathode terminal of the second isolation diode is coupled to the control terminal of the fourth switch and the control circuit.

15. The device with both functions of wireless power transmitter and wireless power receiver according to claim 8, wherein the device with both functions of wireless power transmitter and wireless power receiver is a mobile power bank.

16. The device with both functions of wireless power transmitter and wireless power receiver according to claim 8, wherein the device with both functions of wireless power transmitter and wireless power receiver is a mobile communication device with wireless charging function.

17. A circuit with both functions of wireless power transmitter and wireless power receiver, comprising:
a transceiver coil, comprising a first terminal and a second terminal;
a resonant capacitor, comprising a first terminal and a second terminal, wherein the first terminal of the resonant capacitor is coupled to the second terminal of the transceiver coil
a first switch, comprising a first terminal, a second terminal and a control terminal, wherein the first terminal of the first switch is coupled to a first common terminal, the second terminal of the first switch is coupled to the first terminal of the transceiver coil;
a second switch, comprising a first terminal, a second terminal and a control terminal, wherein the first terminal of the second switch is coupled to the first terminal of the transceiver coil, and the second terminal of the second switch is coupled to a common voltage;
a third switch, comprising a first terminal, a second terminal and a control terminal, wherein the first terminal of the third switch is coupled to the first common terminal, and the second terminal of the third switch is coupled to the second terminal of the resonant capacitor;
a fourth switch, comprising a first terminal, a second terminal and a control terminal, wherein the first terminal of the fourth switch is coupled to the second terminal of the resonant capacitor, and the second terminal of the fourth switch is coupled to the common voltage;
a communication circuit, coupled to the first terminal of the transceiver coil and the second terminal of the resonant capacitor; and
a control circuit, coupled to the communication circuit, the control terminal of the first switch, the control terminal of the second switch, the control terminal of the third switch and the control terminal of the fourth switch, wherein the control circuit is for controlling the first switch, the second switch, the third switch and the fourth switch,
wherein in an energy output mode, the first common terminal receives a power voltage and the control circuit disables the communication circuit and controls the first switch, the second switch, the third switch and the fourth switch to output electromagnetic energy, wherein in an energy receiving mode, the control circuit controls the first switch, the second switch, the third switch and the fourth switch as a single-directional conduction elements to perform rectifier to output a rectified voltage to the first common terminal, in addition, the control circuit controls the communication circuit outputting an energy requirement signal through the transceiver coil according to an amount of received energy, such that the communication circuit can request an energy requirement from an external energy providing circuit.

18. The circuit with both functions of wireless power transmitter and wireless power receiver according to claim 17, wherein the communication circuit comprises:

a first communication capacitor, comprising a first terminal and a second terminal, wherein the first terminal of the first communication capacitor is coupled to the first terminal of the transceiver coil;

a second communication capacitor, comprising a first terminal and a second terminal, wherein the first terminal of the second communication capacitor is coupled to the second terminal of the resonant capacitor;

a first communication switch, comprising a first terminal, a second terminal and a control terminal, wherein the first terminal of the first communication switch is coupled to the second terminal of the first communication capacitor, the second terminal of the first communication switch is coupled to the common voltage, and the control terminal of the first communication switch is coupled to the control circuit; and a second communication switch, comprising a first terminal, a second terminal and a control terminal, wherein the first terminal of the second communication switch is coupled to the second terminal of the second communication capacitor, the second terminal of the second communication switch is coupled to the common voltage, and the control terminal of the second communication switch is coupled to the control circuit.

19. The circuit with both functions of wireless power transmitter and wireless power receiver according to claim 17, further comprising:

a first rectifier diode, comprising an anode terminal and a cathode terminal, wherein the anode terminal of the first rectifier diode is coupled to the first terminal of the transceiver coil, and the cathode terminal of the first rectifier diode is coupled to the first common terminal;

a second rectifier diode, comprising an anode terminal and a cathode terminal, wherein the anode terminal of the second rectifier diode is coupled to the second terminal of the resonant capacitor, and the cathode terminal of the second rectifier diode is coupled to the first common terminal;

a third rectifier diode, comprising an anode terminal and a cathode terminal, wherein the anode terminal of the third rectifier diode is coupled to the common voltage, and the cathode terminal of the third rectifier diode is coupled to the first terminal of the transceiver coil; and a fourth rectifier diode, comprising an anode terminal and a cathode terminal, wherein the anode terminal of the fourth rectifier diode is coupled to the common voltage, and the cathode terminal of the fourth rectifier diode is coupled to the second terminal of the resonant capacitor.

20. The circuit with both functions of wireless power transmitter and wireless power receiver according to claim 17, further comprising:

an energy detection circuit, comprising an input terminal and an output terminal, wherein the input terminal of the energy detection circuit is coupled to the second terminal of the transceiver coil and the first terminal of the resonant capacitor, and the output terminal of the energy detection circuit is coupled to the control circuit, wherein when the circuit with both functions of wireless power transmitter and wireless power receiver is started up and the energy detection circuit detects an energy on the input terminal of the energy detection circuit, the control circuit controls the circuit with both functions of wireless power transmitter and wireless power receiver to enter the energy receiving mode.

21. The circuit with both functions of wireless power transmitter and wireless power receiver according to claim 20, wherein the energy detection circuit comprises:

a DC-blocking capacitor, comprising a first terminal and a second terminal, wherein the first terminal of the DC-blocking capacitor is coupled to the input terminal of the energy detection circuit;

a voltage divider, comprising an input terminal and an output terminal, wherein the input terminal of the voltage divider is coupled to the second terminal of the DC-blocking capacitor, and the output terminal of the voltage divider outputs a divided voltage;

a diode, comprising an anode terminal and a cathode terminal, wherein the anode terminal of the diode is coupled to the output terminal of the voltage divider to receive the divided voltage;

a sampling capacitor, comprising a first terminal and a second terminal, wherein the first terminal of the sampling capacitor is coupled to the cathode terminal of the diode, and the second terminal of the sampling capacitor is coupled to the common voltage; and a discharging resistor, comprising a first terminal and a second terminal, wherein the first terminal of the discharging capacitor is coupled to the first terminal of the sampling capacitor, and the second terminal of the discharging capacitor is coupled to the second terminal of the sampling capacitor.

22. The circuit with both functions of wireless power transmitter and wireless power receiver according to claim 17, further comprising:

an energy detection circuit, comprising an input terminal and an output terminal, wherein the input terminal of the energy detection circuit is coupled to the second terminal of the transceiver coil and the first terminal of the resonant capacitor, and the output terminal of the energy detection circuit is coupled to the control circuit, wherein in the energy output mode, and the energy detection circuit detects that the voltage of the input terminal is in an over-voltage condition, the control circuit controls the circuit with both functions of wireless power transmitter and wireless power receiver enters a protection mode, and stop switching the first switch and the third switch.

23. The circuit with both functions of wireless power transmitter and wireless power receiver according to claim 17, wherein the control circuit is further coupled to the control terminal of the second switch and the control terminal of the fourth switch, and the circuit with both functions of wireless power transmitter and wireless power receiver further comprises:

a first isolation diode, comprising an anode terminal and a cathode terminal, wherein the anode terminal of the first isolation diode is coupled to the second terminal of the resonant capacitor, and the cathode terminal of the first isolation diode is coupled to the control terminal of the second switch and the control circuit; and a second isolation diode, comprising an anode terminal and a cathode terminal, wherein the anode terminal of the second isolation diode is coupled to the first terminal of the transceiver coil, and the cathode terminal of the second isolation diode is coupled to the control terminal of the fourth switch and the control circuit.

* * * * *